April 5, 1966     D. W. CHAMBERLIN     3,244,296

FRUIT PREPARATION MACHINE

Original Filed Feb. 21, 1962     5 Sheets-Sheet 1

FIG_1

INVENTOR
DONALD W. CHAMBERLIN

BY *Hans G. Hoffmeister*

ATTORNEY

April 5, 1966     D. W. CHAMBERLIN     3,244,296
FRUIT PREPARATION MACHINE
Original Filed Feb. 21, 1962     5 Sheets-Sheet 2
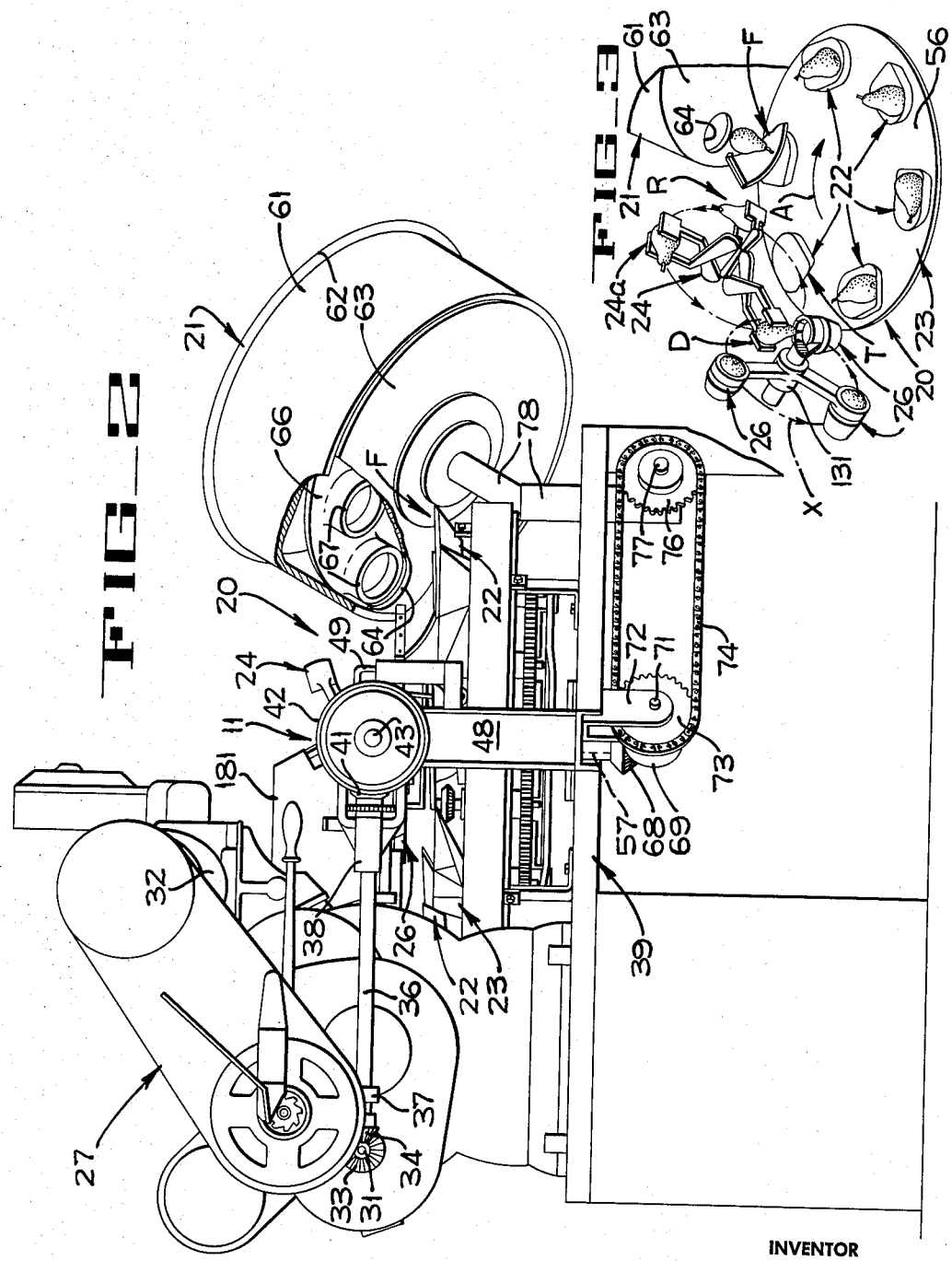
INVENTOR
DONALD W. CHAMBERLIN
BY *Hans G. Hoffmeister*
ATTORNEY

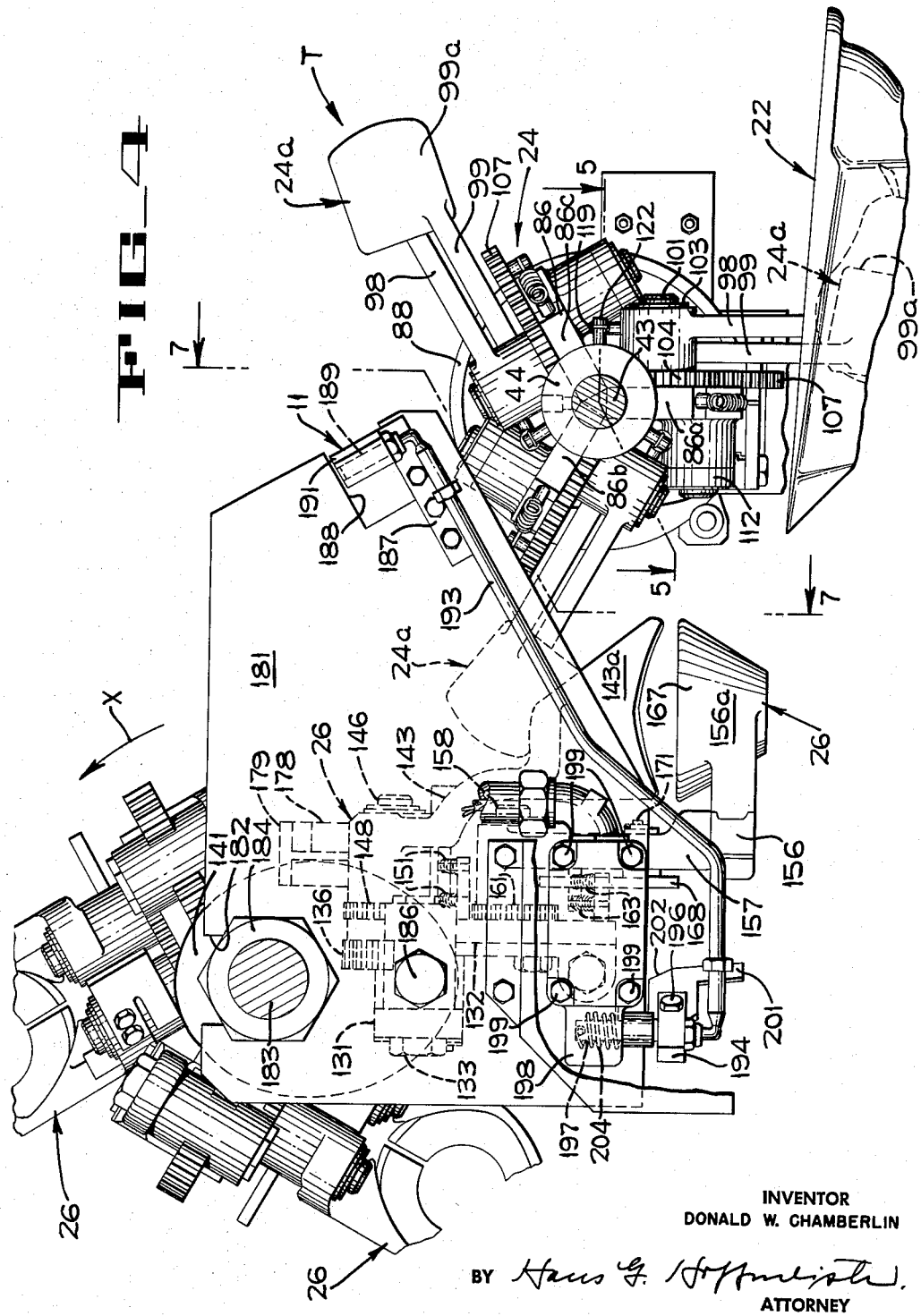

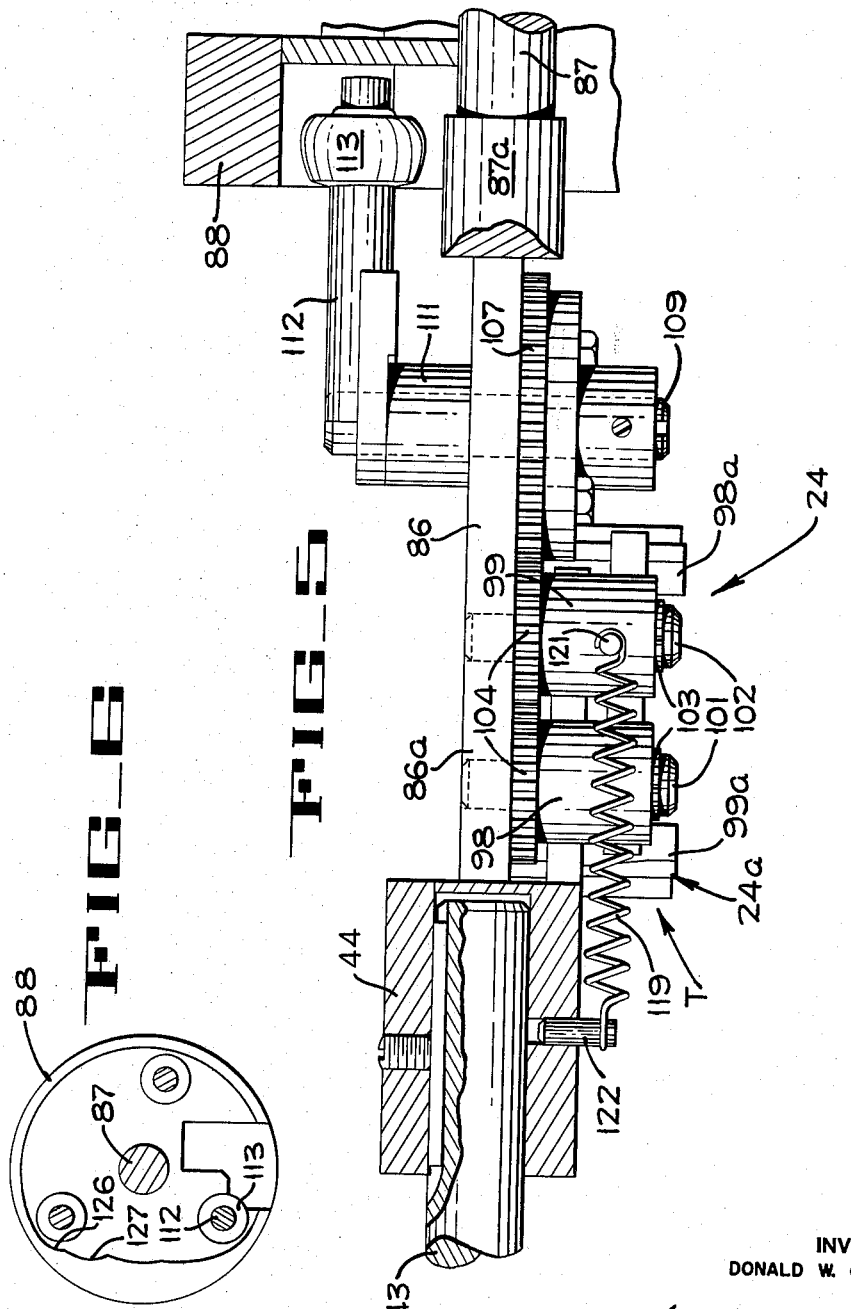

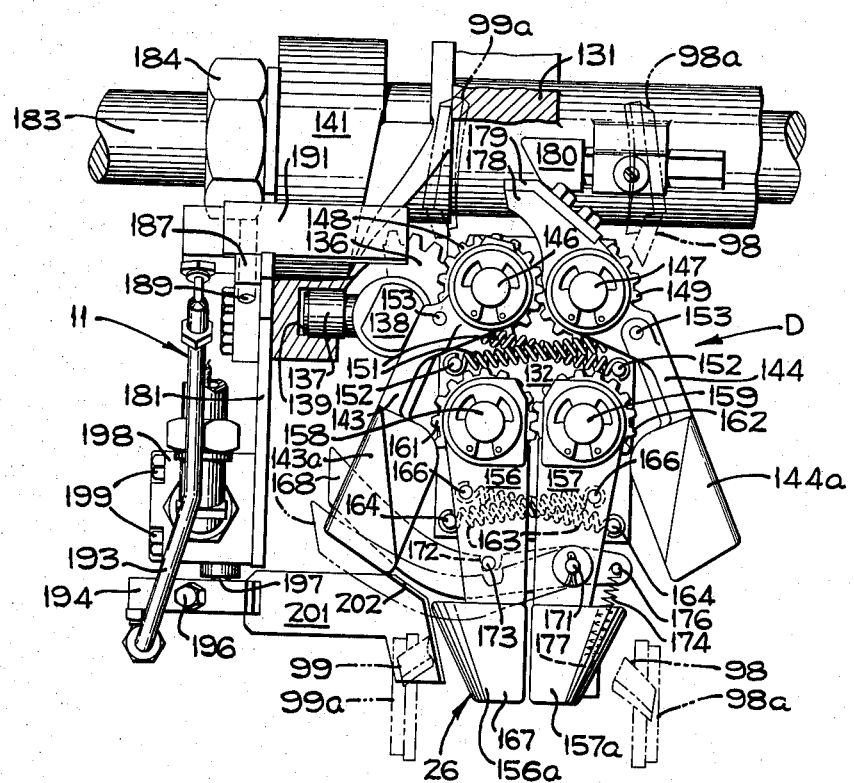
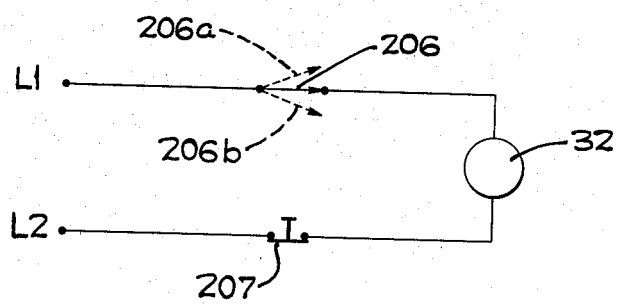

United States Patent Office 3,244,296
Patented Apr. 5, 1966

3,244,296
FRUIT PREPARATION MACHINE
Donald W. Chamberlin, Los Gatos, Calif., assignor to FMC Corporation, San Jose, Calif., a corporation of Delaware
Original application Feb. 21, 1962, Ser. No. 174,909, now Patent No. 3,176,826, dated Apr. 6, 1965. Divided and this application June 8, 1964, Ser. No. 373,389
4 Claims. (Cl. 214—1)

This application is a division of my pending application Serial No. 174,909 filed February 21, 1962, now Patent No. 3,176,826 which issued on April 6, 1965.

The present invention pertains to fruit preparation machines and more particularly relates to apparatus for feeding fruit such as pears to individual processing cups, and to apparatus for detecting the presence of mispositioned parts which are apt to collide and to interrupt the operation of the machine upon such detection.

In pear orienting and feeding apparatus of the type disclosed in the pending application of Chamberlin, Serial No. 144,153, now Patent No. 3,137,383 which issued on June 16, 1964, and which is assigned to the assignee of the present invention, orienting mechanisms with a plurality of moving pear supporting surfaces are provided for rolling the pear about different axes so as to orient one pear at a time. A transfer mechanism then removes the oriented pears from the orienting mechanisms and places these pears individually into one of three cups of a pear preparation machine for further processing.

It has been discovered that certain parts of the transfer mechanism are sometimes spread to such an extent, by unusually large pears or as a result of engaging the ends rather than the sides of pears, that parts of the transfer mechanism are apt to collide or interfere with parts of the cups of the pear preparation machine, resulting in breakage of the transfer mechanism. Similarly, certain parts of the cups may be actuated to such an extent as to interfere with normally positioned parts of the transfer mechanism, thereby causing mechanical interference of the parts.

It is, therefore, one object of the present invention to provide an improved apparatus for feeding oriented pears to a fruit preparation machine.

Another object is to provide means for stopping the machine in the event the transfer mechanism or the pear receiving cups are improperly positioned.

These and other objects and advantages of the present invention will become apparent from the following description and the accompanying drawings, in which:

FIGURE 1 is a plan of a pear preparation machine coupled to a pear orienting mechanism and to the improved feeding apparatus of the present invention, certain parts being shown in phantom.

FIGURE 2 is an elevation of the left end of the machine of FIGURE 1, certain parts being broken away.

FIGURE 3 is a diagrammatic perspective showing the cooperative relationship between certain rotary parts of the pear orienting and feeding apparatus and certain parts of the pear preparation machine.

FIGURE 4 is an enlarged section taken along line 4—4 of FIGURE 1 and showing the adverse-condition detector.

FIGURE 5 is an enlarged horizontal section taken along line 5—5 of FIGURE 4 showing the mounting structure for the transfer mechanism.

FIGURE 6 is a vertical section taken along lines 6—6 of FIGURE 1 showing a barrel cam for operating the transfer mechanism.

FIGURE 7 is a front elevation of a fruit supporting cup and the adverse-condition detector, taken generally along the line 7—7 of FIGURE 4 and showing a portion of the transfer mechanism in phantom lines.

FIGURE 8 is a wiring diagram of a portion of the control circuit used with the present machine.

The adverse-condition detector 11 (FIGS. 4 and 7) of the present invention is associated with a pear orienting and feeding apparatus 20 (FIGS. 1, 2 and 3) which receives pears at a feed station F from a well known pear feeder 21 which deposits pears one at a time into a plurality of equally spaced orienting mechanisms 22. The orienting mechanisms 22 are mounted on a carrier or turret 23 which is continuously driven in the direction of the arrow A in FIGURES 1 and 3. As the turret moves in a circular path in the direction of arrow A, each pear in its respective orienting mechanism 22 is oriented so that the stem end is disposed foremost and the stem blossom axis is generally tangent to the circular path of movement of the pear. After the pear is oriented, it is carried to a transfer station T (FIGURE 3) where jaw units 24a of a transfer mechanism 24 grips each pear independently and removes it from its orienting mechanism 22. The transfer mechanism 24 cooperates with a reject mechanism 25 (FIG. 1) and carries the oriented pears past a reject station R. All unoriented pears are discharged from the transfer mechanism at the reject station R, and the remaining properly oriented pears are carried backward by the transfer mechanism to a discharge station D. At the discharge station, each oriented pear is released from the transfer mechanism 24 and is deposited stem end down into one of three fruit supporting cups 26 (FIG. 3) of a pear preparation machine 27 of well known design, which is arranged to peel, core and perform other desired operations on the pears. The cups 26 are intermittently driven and, during operation, are stopped one by one at the discharge station D of the transfer mechanism.

The pear preparation machine 27 may be of the type disclosed in the United States Letters Patent No. 2,905,216 which issued to M. E. C. Freeman et al. on September 22, 1959. Also, the construction and operation of the pear feeder 21, the orienting apparatus 20, the driving apparatus, and the associated mechanisms are described in the afore-mentioned Chamberlin application Serial No. 144,153, now Patent No. 3,137,383. Reference may be had to the Freeman et al. patent and the Chamberlin application for the details of any structure not discussed in detail hereinafter.

The drive for the turret 23, the transfer mechanism 24 and the pear feeder 21 includes a shaft 31 (FIGS. 1 and 2) of the pear preparation machine 27 which is continuously driven by the motor 32 by internal drive parts (not shown). A bevel gear 33 keyed to the shaft 31 drives a bevel gear 34 which is keyed to one end of a shaft 36. The shaft 36 is suitably journalled in brackets 37 and 38 (FIG. 2) which are secured to the machine 27 and to a rigid support frame 39 of the orienting and feeding apparatus 20, respectively.

A bevel gear 41 is keyed to the other end of the shaft 36 and meshes with a large diameter bevel gear 42 which is secured to one end of a shaft 43 that extends radially of the turret 23, as best shown in FIG. 1. The shaft 43 has one end journalled in a bearing 46, and an intermediate portion journalled in a central block 47. The other end of the shaft 43 is received in and is secured to a hub 44 of the transfer mechanism 24. The bearing 46 is secured to the upper end of a vertically extending channel 48 of the frame 39, and the block 47 is bolted to a looped support bracket 49 (FIGS. 1 and 2) which is secured to a fixed member of the pear preparation machine 27 by a strap 51.

The turret 23 includes a large diameter horizontal disc 56 which is secured to a vertically extending turret shaft 57 (FIG. 1) journalled in the frame 39. A bevel gear 58 is keyed to the upper end of the shaft 57 and meshes with a bevel gear 59 that is keyed to the shaft 43. Thus, rotation of the shaft 43 causes rotation of the turret 23 through the gears 58 and 59.

The pear feeder 21 (FIG. 2) comprises a stationary inclined cylinder 61 having an open inlet end 62 and an inclined floor 63 which has a single discharge opening 64 near its upper end. A false floor 66, having a plurality of tubular fruit receiving pockets 67 formed adjacent its periphery, is mounted for rotation within the cylinder 61. The false floor 66 is driven from a bevel gear 68, keyed to the lower end of the turret shaft 57, that is in driving engagement with a bevel gear 69. The bevel gear 69 is keyed to a shaft 71 that is journalled in a yoke 72 secured to the frame 39. A drive sprocket 73 keyed to the shaft 71 is connected by a chain 74 to a driven sprocket 76 which is keyed to a stub shaft 77. The stub shaft 77 is journalled in a stationary tubular housing 78 which is secured to the frame 39 and to the floor 63 to support the pear feeder 21 in its inclined position. Certain drive parts (not shown) are positioned within the tubular housing 78 and connect the stub shaft 77 in driving engagement with the false floor 66.

Rotation of the false floor 66 causes pears, which are fed into the cylinder 61 in bulk from a conveyor (not shown), to be individually picked up in the pockets 67. The pockets carry the pears upwardly until they reach the discharge opening 64 at which time the pears individually fall through the opening 64 into one of the orienting mechanisms 22 therebelow.

It will be understood that the above drive mechanisms for the turret 23, the pear feeder 21, the transfer mechanism 24, and the fruit supporting cups 26 are timed so that one of the fruit receiving pockets 67 registers with the opening 64 when one of the orienting mechanisms 22 is in position to receive a pear from the feeder 21. Also, the movement of the orienting mechanism 22 and the fruit supporting cups 26 are timed with the movement of the transfer mechanism 24 so that the mechanism 24 can effect a transfer of the oriented pear from each of the orienting mechanisms 22 to the cups 26.

Six equally spaced orienting mechanisms 22 (FIG. 1) are provided and are bolted to the turret disc 56, and each mechanism 22 is arranged to rotate the pear until its stem-blossom axis is tangent to the turret 23 with its stem end foremost as indicated in FIGURE 4. The oriented pear is then advanced to the transfer mechanism 24 which lifts the oriented pear out of the orienting mechanism 22 and places it into one of the cups 26.

As mentioned previously, the transfer mechanism 24 (FIG. 1) is arranged to transfer oriented pears from the several orienting mechanisms 22 individually into the three fruit supporting cups 26 which are intermittently driven and are stopped, one-by-one, at the discharge station D of the transfer mechanism 24. Because the clearance between the transfer mechanism and the cup 26 receiving a pear during the transfer operation is relatively small, the adverse-condition detector 11 of the present invention is provided to detect any abnormality in the position of the cup 26 at the discharge station D or in the position of those parts of the transfer mechanism 24 which swing past the cup 26.

The transfer mechanism 24 is fully described in the Chamberlin application and in general includes the hub 44 (FIGS. 4 and 5) which is keyed to the continuously driven shaft 43, and a Y-shaped support member 86 (FIG. 4) which carries the three fruit gripping jaw mechanisms 24a of the transfer mechanism. The Y-shaped member includes three elongate plates 86a, 86b and 86c which have end faces welded to an end face of hub 44. The other end of each elongate plate is welded to an enlarged end 87a (FIG. 5) of a stub shaft 87 which is concentric with the shaft 43, extends through a drum cam 88, and is journalled in a bearing 89 (FIG. 1) secured to the frame 39. Since all the fruit gripping jaw mechanisms 24a are identical, the description of one will suffice for all.

Each gripping mechanism 24a (FIGS. 4, 5 and 7) includes a pair of gripping arms 98 and 99 having jaws 98a and 99a which have identical configurations, but oppositely disposed, on their free ends. The arms 98 and 99 are pivotally journalled on pins 101 and 102 (FIG. 5) respectively, which are rigidly secured to the associated mounting plate of the Y-shaped member 86. The arms are retained on their associated pins by snap rings 103. Gear segments 104 are secured to the hubs of the gripping arms 98 and 99 and are in mesh, thereby assuring that both arms will be moved equal amounts in opposite directions. A large diameter gear 107 meshes with one of the gears 104 and is secured to a shaft 109 which extends through the associated mounting plate and is journalled in a hub 111 welded to the associated mounting plate. An actuating arm 112 is keyed to the shaft 109 and carries a cam follower 113 near its free end. A spring 119 is connected between a pin 121 on the arm 99 and a pin 122 on the hub 44, and normally urges the fruit gripping jaws 98a and 99a toward each other. The cam follower 113 rides in a drum cam 88 having a first lobe 126 (FIG. 6) therein which opens the jaws 98a and 99a a sufficient amount to permit the jaws to move past the cup 26 without interference and release a pear stem end down and at a precise moment for discharge into the cup 26 at the discharge station D. A second lobe 127 opens the jaws still further preparatory at approaching the next pear to be gripped.

The three fruit supporting cups 26 are mounted on a turret 131, shown diagrammatically in FIG. 3, which is intermittently driven in the general direction indicated by the arrows X (FIG. 3) by internal drive parts (not shown) of the machine 27. Since the three cups 26 are identical, the description of one will suffice for all. The structure for mounting and rotating the cups 26 is fully disclosed in the aforementioned Freeman et al. patent.

Each cup 26 includes a mounting plate 132 (FIGS. 4 and 7) which is pivoted on a bolt 133 which secures the cup to the turret 131 and permits the cup 26 to be pivoted from a position in which its axis is vertical to a position in which its axis is horizontal. The mounting plate 132 includes a gear segment (not shown) that is concentric with the bolt 133 and meshes with a gear segment 136. A cam follower 137 is connected to the gear segment 136 and the segment is journalled on a bolt 138 secured to the turret 131. The cam follower 137 rides in a groove 139 of a fixed cam 141 which groove is arranged to swing the cups 26 so that their axis is vertical at the discharge station D and are horizontal at the other two stations of the turret 131.

The plate 132 carries a pair of upper jaw arms 143 and 144 (FIG. 7) journalled on stub shafts 146 and 147 that are secured to the mounting plate 132 as by welding. Meshing pinions 148 and 149 on the arms 143 and 144, respectively, will assure that the arms will be pivoted equal amounts in opposite directions. Each of two tension springs 151 is connected between one of two pins 152 secured to the plate 132 and one of two pins 153, each pin 153 being secured to one of the arms 143 or 144. The springs 151 urge fruit gripping jaws 143a and 144a formed on the free ends of the arms 143 and 144 toward each other.

A pair of lower jaw arms 156 and 157 are journalled on stub shafts 158 and 159, respectively, and are provided with meshing pinions 161 and 162, respectively, which assure equal and opposite pivoted movement of the arms 156 and 157. Two tension springs 163 are provided and each spring 163 is connected between one of two pins 164 secured to the mounting plate 132 and one of two pins 166, one being secured to each of the lower jaw arms 156 and 157. The springs 163 serve to urge lower jaws 156a and 157a together so as to define a frusto-conical centering chamber 167 when held together.

In order to prevent the spreading of the lower jaws 156a and 157a when the pear is transferred into the cup 26 at station D, a latch arm 168 (FIG. 7) is provided for latching the lower arms 156 and 157 together. The latch arm 168 is pivotally connected to the lower jaw arm 157 by a pin 171, that projects from the arm 157. A locking slot 172 (FIG. 7) in the latch arm 168 is arranged to receive a pin 173, which is secured to the arm 156, to lock the arms 156 and 157 together. A spring 174 is connected between a pin 176 on the latch arm 168 and a pin 177 secured to the arm 157 to normally hold the latch arm 168 in latched position. It is to be understood that the machine 27 includes suitable means for unlatching the lower jaw arms 156 and 157 when it is desired to discharge the pear from its cup 26.

The upper jaws 143a and 144a are positively opened to facilitate feeding of the pear into the latched lower jaws 156a and 157a when each assembly is at the discharge station D. For this purpose, the upper arm 144 of each cup 26 is provided with an extension 178 having a hardened cam plate 179 secured thereto. Each cam plate 179 engages the beveled end of an adjustable cam bar 180 (FIG. 7) shortly before the cup 26 reaches the discharge station D to spread the upper jaws 143a and 144a as shown in FIG. 7. The adjustable cam bars 180 are bolted to the turret 131 adjacent their associated cups 26.

As mentioned previously and as is apparent from a study of FIG. 7, the jaws 98a and 99a of the transfer mechanism 24 must pass between the spaced upper jaws 143a and 144a of the cup 26 at the discharge station D and must move past the outer walls of the lower jaws 156a and 157a.

Accordingly, the adverse-condition detector 11 of the present invention is provided to stop the motor 32 (FIG. 1) in the event the lower jaws 156a and 157a are not latched and accordingly are spaced wider apart than shown in FIG. 7. Also, the detector 11 will stop the motor 32 in the event the fruit gripping transfer jaws 98a and 99a of the transfer mechanism 24 are spread to such an extent that they are apt to engage the upper jaws 143a and 144a.

The adverse-condition detector 11 (FIGS. 4 and 7) comprises a vertically extending mounting plate 181 having a slot 182 in its upper end which receives a stationary shaft 183 upon which the cam 141 is fixed and upon which the turret 131 is journalled. The plate 181 is locked to the cam 141 by a nut 184 screwed on the shaft 183 and a cap screw 186 that extends through a hole in the plate and is screwed into the cam 141. A block 187 is bolted to the plate 181 near a slot 188 therein and carries an upwardly projecting pin 189. A deflector finger 191 is journalled for pivoting movement on the pin 189 and projects through the slot 188 in the plate 181 to a position close to the path of movement of the jaw 99a when the jaws 98a and 99a are separated no greater than the desire dextent. A link 193 is pivotally connected between the deflector finger and a split block 194. The split block 194 is clamped by a cap screw 196 to the shaft 197 of a limit switch 198 which is secured to the plate by four cap screws 199. A deflector finger 201 (FIG. 7) is rigidly secured to the split block 194 and has a downwardly projecting extension disposed closely adjacent to the path of movement of lower jaw 156a of each cup as the cup is moved downwardly and to the left (FIG. 7) under control of cam 141 to the station D at which it is in position to receive a pear from the transfer mechanism. If the jaws 156a and 157a are properly clamped together they will not contact the finger 201. One corner of the finger 201 is chamfered as at 202 to permit unobstructed passage of the latch arm 168 when the arm 168 is properly latched. The deflector finger 201 lies in a vertical plane and projects from the shaft 197, past the vertical plate 181, and toward the cup 26 at an angle of approximately 75° to the plane of plate 181, so that an unlatched cup will gently strike the deflector as it moves to station D.

A helical torsion spring 204 is connected at one end to the housing of the limit switch 198 and at the other end to the shaft 197. The torsion spring 204 normally holds the deflectors 191 and 201 in the position shown in FIGS. 4 and 7 and the actuating element 206 (FIG. 8) of the switch 198 in the closed position.

With the actuating element 206 in the closed position, the motor 32 is initially started by actuating a magnetic start switch 207 which establishes a circuit which includes main line L1, the element 206, the motor 32, the start switch 207 and the main line L2. If the deflector 191 is contacted by a jaw 99a of the transfer mechanism 24 the actuating element 206 is moved to the position 206a to open the circuit thereby stopping the motor 32. Similarly, if the lower jaws 156a or 157a are not latched when they approach the discharge station D and the jaw 156a contacts the deflector 201, the element 206 will be moved to the position 206b to open the circuit and stop the motor 32. When the motor 32 stops, the operator first corrects the difficulty and then starts the motor 32 by actuating the start switch 207.

In the operation of the adverse-condition detector 11 of the present invention, the different parts of the fruit preparation machine are placed in operation by closing the magnetic start switch 207 (FIG. 8). Normal operation of the machine continues unless the jaws 98a and 99a are excessively spaced and contact the deflector 191, or unless the lower jaws are not latched so that either the latch arm 168 or the lower jaw 156a contacts the deflector 201.

If the jaws 98a and 99a are excessively spread and contact the deflector 191, the deflector will be pivoted in one direction causing the link 193 and split block 194 to pivot the actuating element 206 of the switch 198 to the position 206a to open the circuit of the motor 32 and stop the machine. The operator then corrects the difficulty, which may be a pear gripped end-to-end or an oversize pear, and restarts the machine by actuating the start switch 207.

If the lower cup jaws 156a and 157a are not latched, either the latch arm 168 or the cup 156a contacts the deflector 201 and pivots the deflector in the opposite direction to move the actuating element 206 of the switch 198 to the position 206b. The latch arm 168 will contact the deflector if, for example, a stem is disposed between the jaws 156a and 157a thereby preventing the latch arm 168 from moving into the latched position. If the jaws 156a or 157a are spaced wider apart by, for example, a soft pear therein, the jaw 156a will contact the deflector 201 to actuate the limit switch 198.

From the foregoing description, it is apparent that the fruit preparation machine includes an adverse condition detector which stops the machine in the event that either the fruit supporting cups are not properly latched or if the jaws of the transfer mechanism are spaced more than a predetermined permissible amount.

While one embodiment of the present invention has been shown and described, it will be understood that various changes and modifications may be made without departing from the spirit of the invention or the scope of the appended claims.

The invention having thus been described what is believed to be new and desired to be protected by Letters Patent is:

1. In a pear orienting and feeding apparatus, the combination of a pair of jaws movable between an open and a closed position, a latch arm connected to said jaws and projecting outwardly therefrom, said latch arm being movable from a position latching said jaws together to an unlatched position, a drive motor, means connecting said drive motor to said jaws for moving said jaws and said latch arm as a unit along a predetermined path, and switch means connected to said motor and having an actuating element disposed alongside of the path of movement of said latch arm when said arm is in said latched position, said actuating element being disposed in the path of movement of said arm when said arm is in the unlatched position whereby said arm contacts said actuating element to open said switch means and stop said motor.

2. In a pear orienting and feeding apparatus, the combination of a pair of fruit support jaws resiliently urged together and arranged to receive a pear, latching means connected to said jaws and movable between a position latching said jaws together and a position permitting said jaws to separate, a pair of transfer jaws resiliently urged toward each other for gripping an oriented pear and depositing the oriented pear stem end down into said support jaws at a discharge station, means including a drive motor for intermittently moving said support jaws upwardly along a path to said discharge station, means for moving said transfer jaws downwardly through said discharge station to pass on opposite sides of said support jaws, cam means connected to said transfer jaws for separating said transfer jaws when moving past said support jaws a distance sufficient to release a pear therein and move outwardly of said support jaws when said support jaws are clamped together, a normally closed limit switch connected to said motor for controlling the actuation of the same, and a detector finger connected to said switch and projecting into the path of movement of said support jaws only when said support jaws are unlatched, said detector switch being arranged to open said switch and stop said motor when contacted by said support jaws when unlatched to avoid collision of said transfer jaws with said support jaws.

3. In a pear orienting and feeding apparatus, the combination of a fruit supporting cup having a pair of lower jaws and a pair of upper jaws resiliently urged toward each other, cam means operatively connected to said upper jaws for spacing said upper jaws a predetermined amount at a discharge station, a pair of transfer jaws resiliently urged together and disposed adjacent said discharge station for gripping an oriented pear and depositing the pear stem end down in said lower jaws, drive means including a drive motor for intermittently moving said cup along a path into said discharge station and for continuously moving said transfer jaws in a circular path into and through said discharge station to move past said lower and upper jaws, cam means connected to said transfer jaws for spacing said transfer jaws a distance less than said predetermined amount and greater than the width of said lower jaws when latched together whereby said transfer jaws pass through said discharge station inwardly of said upper jaws but outwardly of said lower jaws, a deflector finger pivotally mounted in position to be engaged by one of said transfer jaws only when the spacing between said transfer jaws exceeds that of said predetermined amount, a normally closed limit switch connected to said motor, and means connecting said limit switch to said deflector finger whereby pivotal movement of said connecting means causes actuation of said switch to open said switch and stop said motor thereby avoiding collision between said transfer jaws and said upper jaws.

4. In a pear orienting and feeding apparatus, the combination of a fruit supporting cup having a pair of lower jaws resiliently urged together and a pair of upper jaws resiliently urged toward each other, latch means connected to said jaws and movable between a position latching said lower jaws together and a position permitting said lower jaws to separate, said latch means including a latch arm projecting outwardly therefrom, cam means operatively connected to said upper jaws for spacing said upper jaws a predetermined amount at a discharge station, a pair of transfer jaws resiliently urged together and disposed adjacent said discharge station for gripping an oriented pear and depositing the pear stem end down in said lower jaws, drive means including a drive motor for intermittently moving said cup along a path into said discharge station and for continuously moving said transfer jaws in a circular path through said discharge station in a direction opposite to that of said cup, cam means connected to said transfer jaws for spacing said transfer jaws a distance less than said predetermined amount and greater than the width of said lower jaws when latched together, a first deflector finger pivotally mounted in position to be engaged by said latch arm only when said latch arm is in the unlatched position, a second deflector finger pivotally mounted in position to be engaged by one of said transfer jaws only when the spacing between said transfer jaws exceeds that of said predetermined amount, means for pivotally interconnecting said deflector fingers, a normally closed limit switch connected to said interconnecting means and to said motor and arranged upon movement of said interconnecting means in either direction to open said switch and stop said motor thereby avoiding collision between said transfer jaws and said upper and lower jaws.

References Cited by the Examiner

UNITED STATES PATENTS

| | | | |
|---|---|---|---|
| 2,631,769 | 3/1953 | Everett | 198—232 X |
| 2,794,541 | 6/1957 | Chayka | 198—232 |
| 3,137,383 | 6/1964 | Chamberlain | 198—33 |

MARVIN A. CHAMPION, *Primary Examiner.*